United States Patent [19]
Knutson et al.

[11] 3,769,151
[45] Oct. 30, 1973

[54] ADHESIVE COMPOSITION AND METHOD OF PREPARATION

[75] Inventors: Gaylen M. Knutson, Yorba Linda; John Biale, Placentia, both of Calif.

[73] Assignee: Union Oil Company of California, Los Angeles, Calif.

[22] Filed: Feb. 14, 1972

[21] Appl. No.: 226,257

[52] U.S. Cl.............. 161/204, 156/332, 161/208, 161/218, 161/251, 161/254, 260/29.6 WB, 260/29.6 WA, 260/878
[51] Int. Cl............................ C08f 37/18, C09j 3/14
[58] Field of Search.......... 260/29.6 WB, 29.6 WA, 260/29.6 TA, 878; 161/204, 208, 218

[56] References Cited
UNITED STATES PATENTS

| | | | |
|---|---|---|---|
| 3,265,654 | 8/1966 | Glabisch et al.............. | 260/29.6 |
| 3,296,170 | 1/1967 | Burkhart et al............. | 260/29.6 |
| 3,355,322 | 11/1967 | Worrall et al............... | 117/126 |
| 3,578,618 | 5/1971 | Beardsley..................... | 260/17 |
| 3,585,175 | 6/1971 | Corey........................... | 260/80.8 |
| 3,661,696 | 5/1972 | Knutson....................... | 161/204 |

FOREIGN PATENTS OR APPLICATIONS

| | | | |
|---|---|---|---|
| 1,117,711 | 6/1968 | Great Britain............. | 260/29.6 WB |

Primary Examiner—William H. Short
Assistant Examiner—Earl A. Nielsen
Attorney—Milton W. Lee et al.

[57] ABSTRACT

A process for the production of an aqueous emulsion of an ethylene-vinyl acetate polymer is disclosed wherein the polymerization is performed in the presence of a preformed seed emulsion, from 1.5 to 6 weight percent of a protective colloid comprising a mixture of fully and partially hydrolyzed polyvinyl acetate and a minor amount, from 0.01 to 1 weight percent, of an unsaturated acid having from three to six carbon atoms. The seed emulsion is comprised of an aqueous emulsion containing from 25 to 63 weight percent of ethylene-vinyl acetate copolymers having an ethylene content between about 5 and 20 weight percent and from 2 to 6 weight percent of a partially hydrolyzed polyvinyl acetate. The polymerization is performed under an ethylene pressure of from 100 to 1000 psig., sufficient to incorporate from 5 to 20 weight percent ethylene in the final copolymer product and carried out until the total free monomer content of the emulsion is maintained below about 1 weight percent. Conventional free radical initiation of the polymerization reaction is used. The resultant emulsion can be used as an adhesive since films formed therefrom exhibit a high degree of adhesiveness.

20 Claims, No Drawings ved adhesive.

ADHESIVE COMPOSITION AND METHOD OF PREPARATION

DESCRIPTION OF THE INVENTION

This invention relates to an improved adhesive composition and method for making the same. More particularly, this invention relates to a method of preparing an adhesive composition having improved adhesion to vinyl plastics and an improved thickening response and to the product produced by this method.

Recent commercial applications of adhesives have increased the demand for adhesives having quite selective properties. A few of these properties, which many applications now require, include high moisture resistance, low flammability, low biological toxicity, etc. In addition it is generally advantageous to select adhesives which do not crystallize and become brittle and which can be applied at ambient temperatures.

A particularly desirable property which has heretofore been difficult to obtain with conventional adhesives is a good adhesion to vinyl plastics, while at the same time having a good thickening response. The development of adhesives having these properties has attracted considerable attention because of the ubiquity of the vinyl plastics, such as polyvinyl chloride and polyvinyl acetate.

Many adhesives possess some of the above desired properties but are lacking in others. For example, proteinaceous adhesives generally have good adhesion and can be applied at ambient temperatures but are highly susceptible to moisture and thus are quite inadequate in a moist environment. Another common adhesive which has good adhesional properties is a solution of polyacrylates in an organic solvent; however, this adhesive is usually flammable and toxic and exhibits a detrimental effect on plastics by causing swelling or solvation. Another adhesive which has good moisture resistance and low flammability is an ethylene-vinyl acetate copolymer having high ethylene content. This adhesive, however, must be melted before its application to the desired surfaces. Many surfaces, such as paper products and some plastics, cannot be heated sufficiently without partial or total destruction of the product or surface. Attempts to emulsify the high ethylene content copolymers to provide a latex adhesive, which can be applied at ambient temperatures, have been relatively unsuccessful.

Recently, an emulsion of an ethylene-vinyl acetate copolymer having a low ethylene content and containing a polyvinyl alcohol protective colloid has been introduced into the adhesives market. This emulsion is suitable for many purposes, however, films from the emulsion lack adequate adhesion to vinyl plastics. Attempts to improve the vinyl adhesion of the adhesive by the employment of a seed emulsion in the polymerization process, while substantially improving the adhesion, results in a low thickening response. A commonly assigned copending application Ser. No. 77,018 describes the process steps utilizing a seed emulsion. A need therefore still exists for an adhesive for vinyl plastics which possesses the aforementioned properties. The adhesive should also have a low biological toxicity, and should not cause swelling or solvation of the plastic products.

Accordingly, an object of this invention is to provide an improved adhesive.

Another object of this invention is to provide a latex of an ethylene-vinyl acetate polymer having improved adhesional and thickening response properties.

Another object of this invention is to provide an adhesive emulsion that can be applied at ambient temperatures and that has an excellent adhesion to vinyl plastics.

A further object of this invention is to provide an improved method of making the aforementioned emulsion.

Other objects and advantages of this invention will be apparent to those skilled in the art from the description thereof which follows.

The aforesaid objects and their attendant advantages can be attained with an aqueous ethylene-vinyl acetate polymer emulsion having a low ethylene content and formed by the emulsion polymerization of ethylene and vinyl acetate in the presence of a seed emulsion, a small amount of an unsaturated acid, and a small amount of a polyvinyl alcohol mixture consisting of fully and partially hydrolyzed polyvinyl acetate. The seed emulsion comprises an aqueous emulsion of an ethylene-vinyl acetate copolymer having a low ethylene content and copolymerized in substantially the same manner as the polymer in the final adhesive emulsion. The polyvinyl alcohol is a commercially available material and is prepared by hydrolysis of polyvinyl acetate. The polyvinyl alcohol has a varied degree of hydrolysis of the acetate groups to hydroxyl groups and will be referred to hereinafter as a hydrolyzed polyvinyl acetate with a specified degree of hydrolysis. While the manner in which the seed emulsion functions is not known with certainty, it is known that the polymerization of ethylene and vinyl acetate in the presence of the seed emulsion and the unsaturated acid substantially improves the adhesion strength of the resulting emulsion and its thickening response. The emulsions prepared by the practice of this invention have been found to exhibit excellent adhesion to vinyl plastics, can be applied at ambient conditions, are relatively moisture resistant, have a low toxicity and do not crystallize or become brittle. In addition, the emulsions are relatively grit-free, i.e., do not form visible macroparticles in thin films of the emulsion upon drying.

We have found that by incorporating from 0.01 to 1 weight percent based on the weight of the final emulsion of an unsaturated acid into the reaction zone during polymerization, the resulting emulsion adhesive exhibits excellent vinyl adhesion while at the same time possesses a good thickening response when admixed with a standard plasticizer. The acid takes part in the polymerization to form a terpolymer of ethylene, vinyl acetate and unsaturated acid.

PREPARATION OF THE SEED EMULSION

The seed emulsion is prepared by an emulsion copolymerization technique and comprises dispersing in an aqueous medium having a pH of about 3 to 9 and preferably between about 4 to 8 from 30 to 60 weight percent of vinyl acetate and a minor portion (from 2 to 6 weight percent) of partially hydrolyzed polyvinyl acetate. The dispersion is contacted with a free radical precursor as the polymerization initiator and ethylene under a pressure of about 100 to 1000 psig. The polymerization is initiated by heating the medium to a temperature of about 100° to 225°F., sufficient to decompose the precursor and release free radicals. The copolymerization is allowed to proceed while agitating the aqueous medium to maintain the dispersion until the free or unreacted vinyl acetate monomer in the emulsion is reduced to less than 5 weight percent and preferably less than 1 weight percent of the seed emulsion.

In a preferred embodiment, a small portion of the total vinyl acetate and the partially hydrolyzed polyvinyl acetate components are precharged to the aqueous polymerization medium prior to the initiation of the reaction. In this embodiment, from 5 to 30 weight percent of the total vinyl acetate and from 2 to 40 weight percent (preferably from 2 to 10 weight percent) of the total polyvinyl alcohol solution are preferably precharged to the reactor along with a small amount (0.05 to 1 weight percent) of an emulsifier. The remainder of the vinyl acetate and hydrolyzed polyvinyl acetate is continuously added to the reaction zone during the copolymerization along with the polymerization initiator. By adding the vinyl acetate monomer and hydrolyzed polyvinyl acetate concurrently during the copolymerization reaction, the resulting emulsion is free of large and microparticulate grit. Also in this embodiment the copolymerizing ethylene and vinyl acetate monomers are continuously added onto the ends of primortal copolymers and frequently form copolymers having an average length within the range of from about 0.4 to 2.5 microns. Preferably the copolymerization reaction is conducted so that the seed emulsion contains ethylene-vinyl acetate copolymers having an average length within about 0.5 and 2.0 microns.

The amount of vinyl acetate and ethylene which is introduced into the polymerization is selected so that the seed emulsion contains between about 25 and 65 weight percent of the ethylene-vinyl acetate copolymer and more preferably between about 30 and 60 weight percent copolymer.

The seed emulsion should finally contain between about 2 and 6 weight percent of partially hydrolyzed polyvinyl acetate to impart the desired degree of adhesion to the product adhesive. In addition, the degree of hydrolysis of the partially hydrolyzed polyvinyl acetate significantly affects the ability of the seed emulsion to impart the desired adhesiveness to the final adhesive emulsion at elevated temperatures. Generally the degree of hydrolysis can vary from 50 to 95 percent, preferably from 80 to 92 percent of the acetate groups, and excellent results can be achieved with the polyvinyl acetate that has 87 to 90 weight percent of its acetate groups hydrolyzed to hydroxyl groups. The partially hydrolyzed polyvinyl acetate component should also exhibit a viscosity of about 2 to 80 centipoises and preferably about 3 to 45 centipoises for a 4 weight percent aqueous solution at a temperature of 20°C. as determined by the Hoeppler falling ball method. Exemplary of the partially hydrolyzed polyvinyl acetate component include ELVANOL 51-05, a low molecular weight, 87 to 89 percent hydrolyzed polyvinyl acetate, and ELVANOL 52-22 an intermediate molecular weight, 87 to 89 percent hydrolyzed polyvinyl acetate, which are marketed by E. I. duPont de Nemours.

The copolymerization reaction is conducted so that the amount of ethylene in the resulting seed copolymer is maintained between about 5 and 20 weight percent and preferably between 7 and 18 weight percent of resulting copolymer. The ethylene content can be controlled by regulating the process conditions during the polymerization reaction, such as the ethylene partial pressure, the temperature, the vinyl acetate addition rate to the reactor or the amount of polymerization initiator employed. The type of emulsifier which can be employed herein is described infra under the discussion of emulsifiers in the adhesive emulsion. The amount of emulsifier precharged to the reaction zone generally varies from 0.01 to 1 weight percent and preferably from 0.05 to 0.3 of the final seed emulsion.

PREPARATION OF THE ADHESIVE EMULSION

The adhesive emulsion is prepared by emulsion polymerization. In this polymerization, vinyl acetate, an unsaturated acid, a polyvinyl alcohol mixture and a portion of the seed emulsion are emulsified in an aqueous medium having a pH between about 3 and 9. A free radical precursor is incorporated in the emulsion which is contacted with ethylene under pressure and the emulsion is heated to decompose the precursor and release free radicals which initiate polymerization of the ethylene and vinyl acetate monomer within the emulsion. It has been found that the polymerization of ethylene and vinyl acetate in the presence of the aforementioned seed emulsion, an unsaturated acid, and the polyvinyl alcohol mixture results in a product polymer emulsion having the desired thickening response and vinyl adhesion properties.

The polymerization of ethylene, vinyl acetate and unsaturated acid is conducted so that the amount of ethylene in the polymer is maintained from 5 to about 20 weight percent and preferably between about 10 and 15 weight percent of the polymer. The ethylene content in the polymer can be controlled by regulating the process conditions during the polymerization reaction in the same manner as disclosed supra in the preparation of the seed emulsion, such as by controlling the ethylene partial pressure, the temperature, the vinyl acetate addition rate to the reactor or the amount and type of polymerization initiator employed. The low ethylene content allows the product adhesive to be formed into a stable emulsion so that it can be applied to various surfaces at low or ambient temperatures. Ethylene contents above 20 weight percent are undesirable for emulsion applications as described in this invention since such polymers generally have too low a molecular weight and form adhesives having a low cohesive strength. The cohesive strength is a measure of the polymer strength and a low cohesive strength connotes that only a small force is necessary to cleave the polymer.

The amount of seed emulsion charged to the reactor will vary over a wide range depending upon the reaction conditions and the selected adhesive emulsion contents. Generally the amount of seed emulsion based on 50 weight percent solids ranges from 5 to about 50 weight percent and preferably between about 10 and 30 weight percent of the adhesive emulsion product. It has been found, for example, that an improved adhesive having excellent vinyl adhesion can be prepared when a seed emulsion of from 10 to 25 weight percent is employed.

The amount of vinyl acetate charged to the reactor is dependent upon the desired solids content of the emulsion, but generally ranges from 25 to 60 weight percent of the emulsion. The amount of vinyl acetate charged to the reactor is further dependent upon the amount of seed emulsion which is employed. For example, as the amount of seed emulsion charged to the reactor increases the amount of vinyl monomer charged thereto is proportionally decreased. The following Table I illustrates the amount of monomer which can be employed in the practice of this invention for various ranges of seed emulsion charged to the reactor.

TABLE I

| Seed Emulsion (Weight Percent) | Vinyl Acetate (Weight Percent) |
|---|---|
| 5–10 | 30–60 |
| 10–30 | 25–55 |
| 30–50 | 5–35 |

The addition of the unsaturated acid to the polymerization medium has a pronounced effect on increasing the vinyl adhesion while at the same time effecting a high thickening response. The thickening response as discussed herein is a measure of the increase in viscosity of the emulsion after admixture with a minor amount of a standard plasticizer such as dibutyl phthalate to its original viscosity.

The unsaturated acid can comprise any monoethylenically carboxylic acid or combination of unsaturated acid having from three to six carbons. The acid may also be mono or dicarboxylic. Exemplary acids include acrylic, methacrylic, itaconic, fumaric, crotonic, citraconic, mesaconic, aconitic, ethyl maleic, methyl itaconic, maleic acid, etc. The preferred unsaturated acids are acrylic and methacrylic acid and combinations thereof and more preferably acrylic acid.

The amount of unsaturated acid which can be used to realize the advantages of this invention varies depending upon the exact properties desired, surfactant employed, amounts of other components, etc. Generally, however, the amount of acid is preferably maintained between about 0.01 and 1 weight percent and preferably between about 0.05 and 0.5 weight percent based on the weight of said adhesive emulsion.

The polyvinyl alcohol mixture has been found to impart a substantial improvement to the adhesion of films formed from the emulsion to vinyl plastics. The maximum degree of adhesion of such films is achieved when between about 1.5 and 6 weight percent of the alcohol mixture is added to the product emulsion. This polyvinyl alcohol does not include the polyvinyl alcohol (partially hydrolyzed polyvinyl acetate) originally within the seed emulsion and hence the total polyvinyl alcohol in the final emulsion is the cumulative amount of the polyvinyl alcohol mixture added to the product emulsion plus the amount of polyvinyl alcohol originally within the seed emulsion.

The polyvinyl alcohol mixture is a combination of partially hydrolyzed and fully hydrolyzed polyvinyl acetate with a weight ratio of fully to partially hydrolyzed polyvinyl acetate between about 1 to 10 and 10 to 1 and preferably between about 1 to 5 and 5 to 1. The mixture may be added to the emulsion as the pure polymer components, or alternatively may be added as an aqueous solution containing the hydrolyzed polyvinyl acetate mixture at the recited concentration and weight ratios.

The most effective of the fully hydrolyzed polyvinyl acetates are those which, when dissolved in water at 4 weight percent concentration, exhibit a viscosity of from 5 to 125 centipoises at a temperature of 20°C. as determined by the Hoeppler falling ball method. Exemplary of the fully hydrolyzed polyvinyl acetate components include GOHSENOL NL05, a low molecular weight fully hydrolyzed polyvinyl acetate marketed by Bently Chemical Corporation and ELVANOL 70–05, a low molecular weight, fully hydrolyzed polyvinyl acetate marketed by E. I. duPont de Nemours.

The most effective of the partially hydrolyzed polyvinyl acetates are those which are from 50 to 95, preferably from 80 to 95 percent and, most preferably, from 87 to 90 percent hydrolyzed, and which exhibit a viscosity between about 2 and 80 centipoises and preferably between 3 and 43 centipoises as determined by the Hoeppler falling ball method for a 4% aqueous solution at a temperature of 20°C. Exemplary of the partially hydrolyzed polyvinyl acetate component include ELVANOL 51–05, a low molecular weight, 87 to 89 percent hydrolyzed polyvinyl acetate, and ELVANOL 52–22, an intermediate molecular weight, 87 to 89 percent hydrolyzed polyvinyl acetate which are marketed by E. I. duPont de Nemours.

The total amount of vinyl acetate, polyvinyl alcohol and seed emulsion is selected so that the product emulsion has a solids content between about 25 and 70 weight percent and preferably between about 35 and 65 weight percent in order to realize an adhesive emulsion having the desired viscous properties. Emulsions having a solids content below 25 weight percent have too low of a viscosity for most commercial applications, while emulsions having a solids content greater than 70 weight percent tend to form separate phases upon standing and usually require application to the surfaces as a hot melt.

The polymerization reaction in both the seed emulsion and final emulsion is initiated by a water soluble free radical initiator such as a water soluble peracid or salt thereof, e.g., hydrogen peroxide, sodium peroxide, lithium peroxide, peracetic acid, persulfuric acid or the ammonium and alkali metal salts thereof, e.g., ammonium persulfate, sodium peracetate, lithium persulfate, potassium persulfate, sodium persulfate, etc. A suitable concentration of the initiator is from 0.05 to 5.0 weight percent and preferably from 0.1 to 3 weight percent of the vinyl acetate monomer in the emulsion.

The free radical initiator can be used alone and thermally decomposed to release the free radical initiating species or can be used in combination with a suitable reducing agent in a redox couple. The reducing agent is typically an oxidizable sulfur compound such as an alkali metal metabisulfite or pyrosulfite. A particularly preferred reducing agent is sodium or potassium formaldehyde sulfoxylate such as FORMOPON marketed by Rohm and Haas Company. The presence of the reducing agent in the polymerization medium achieves a release of free radicals at a lower temperature than necessary in its absence and thereby promotes formation of higher molecular weight copolymer products. The amount of reducing agent which can be employed throughout the copolymerization generally varies from about 0.1 to 3 weight percent of the amount of vinyl acetate monomer, however, in a preferred embodiment the reducing agent is only employed to initiate the reaction and hence is necessary only in small amounts which is generally between about 0.001 to 0.02 weight percent of vinyl acetate monomer to be polymerized.

Numerous buffering agents can be employed in the above mentioned polymerization reaction and these can generally comprise any water soluble additive capable of adjusting the pH of the water to the desired level while being relatively inert to the polymerization reaction. Exemplary buffer agents include ammonium and alkali metal salts of weak acids such as diammonium orthophosphate, tetrasodium pyrophosphate, sodium acetate, potassium acetate, etc. Alkali metal or ammonium carbonates and bicarbonates, such as sodium carbonate, sodium bicarbonate, potassium carbonate, potassium bicarbonate etc., can also be employed.

In addition to the polyvinyl alcohol, vinyl acetate, unsaturated acid, and seed emulsion, other additives may be included within the emulsion without substantially affecting its adhesive properties. One such additive is an emulsifying agent which may be employed to improve the emulsion stability and in many instances improve the vinyl adhesive and thickening response. The employment of an emulsifier is especially advantageous when a high polymer content is desired. The emulsifying agents can be nonionic, cationic or anionic, however, the nonionic and anionic agents are preferred and the anionic are most preferred.

The concentration range of the total mount of emulsifying agents useful in the adhesive can be from 0.01 to 5 weight percent of the emulsion. It is recognized that the inclusion of emulsifying agents is not critical to the invention and they can be entirely eliminated.

In the following discussion of emulsifying agents, frequent reference will be made to the cloud point of a particular agent. The cloud points which are recited are based on 1 weight percent aqueous solutions of the agent. A relatively hydrophobic agent is one having a cloud point below 190°F. and a relatively hydrophilic agent is one having a cloud point of 90°F. or above.

A single emulsifying agent can be used or the emulsifying agents can be used in combination. When combinations of emulsifying agents are used, it is advantageous to use a relatively hydrophobic emulsifying agent in combination with a relatively hydrophilic agent.

Suitable nonionic emulsifying agents include polyoxyethylene condensates represented by the following general formula:

$$R-(CH_2-CH_2-O)_n H$$

where R is the residue of a fatty alcohol, acid, amide, or amine having from 10 to 18 carbon atoms or an alkyl phenol having from 10 to 18 carbon atoms; and where n is an integer of 1 or above and preferably between 5 and 30. Some specific examples of polyoxyethylene condensates which can be used include polyoxyethylene aliphatic ethers such as polyoxyethylene lauryl ether, polyoxyethylene oleyl ether, polyoxyethylene hydroabietyl ether and the like; polyoxyethylene alkaryl ethers such as polyoxyethylene nonylphenyl ether, polyoxyethylene octylphenyl ether and the like; polyoxyethylene esters of higher fatty acids such as polyoxyethylene laurate, polyoxyethylene oleate and the like as well as condensates of ethylene oxide with resin acids and tall oil acids; polyoxyethylene amide and amine condensates such as N-polyoxyethylene lauramide and N-lauryl-N-polyoxyethylene amine and the like; and polyoxyethylene thioethers such as polyoxyethylene n-dodecyl thioether.

Some examples of nonionic emulsifying agents which can be used include a polyoxyethylene nonylphenyl ether having a cloud point of between 126° and 133°F. and marketed under the trademark "IGEPAL CO-630," and a polyoxyethylene nonylphenol ether having a cloud point above 212°F. and marketed under the trademark "IGEPAL CO-887." A similar polyoxyethylene nonylphenyl ether having a cloud point of about 86°F. is marketed under the trademark "IGEPAL CO-610" and is also a good emulsifying agent. Another agent is a polyoxyethylene octylphenyl ether having a cloud point of between 80°F. and 160°F. and marketed under the trademark "Triton X-100." Another agent is a nonylphenoxy polyethoxy ethanol marketed under the trademark "TRITON N-101." Other emulsifying agents include a polyoxyethylene oleyl ether having a cloud point of between 80°F. and 160°F. and marketed under the trademark "ATLAS G-3915," a nonylphenyl polyethylene glycol ether marketed under the trademark "TERGITOL NPX," and a polyoxyethylene lauryl ether having a cloud point above 190°F. and marketed under the trademark "BRIJ 35."

The nonionic emulsifying agents which can be used according to this invention also include a series of surface active agents known as "PLURONICS." The "PLURONICS" have the general folmula:

$$HO(C_2H_4)_a(C_3H_6O)_b(C_2H_4O)_c H$$

where a, b and c are integers between 1 and about 100. At the ratio of b to a and c increases, the compounds become less water soluble and more oil soluble and thus more hydrophobic, while as the ratio decreases the compounds become more water soluble and less oil soluble. An example of this class is "PLURONIC L-64" which has a cloud point of about 140°F. and a polyoxypropylene chain having a molecular weight of 1500 to 1800 and a polyoxyethylene content that is 40 to 50 percent of the total weight of the molecule. Another useful example is "PLURONIC F-68," a polyxoyethylene-polyoxypropylene glycol having a cloud point of about 212°F. and a polyoxyethylene content of about 80 to 90 percent of the total weight of the molecule.

A class of highly suitable emulsifying agents are a series of ethylene oxide adducts of acetylenic glycols sold commercially under the name "SURFYNOLS." This class of compounds can be represented by the formula:

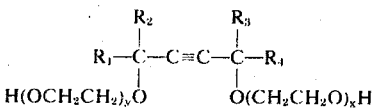

in which $R_1$ and $R_2$ are alkyl radicals containing from 3 to 10 carbon atoms, $R_2$ and $R_3$ are selected from the group consisting of methyl and ethyl, and x and y are integers having a sum in the range of 3 to 60, inclusive.

Representative of the "SURFYNOLS" are "SURFYNOL 465" which is an ethylene oxide adduct of 2,4,7,9-tetramethyl decynediol containing an average of 10 moles of ethylene oxide per mole of the surface active agent. "SURFYNOL 485" corresponds to "SURFYNOL 465" but contains an average of 30 moles of ethylene oxide per mole of surface active agent. "SURFYNOL 485" has a cloud point above 212°F.

Anionic emulsifying agent which can be employed herein include anionic compounds obtained by sulfonation of fatty derivatives such as sulfonated tallow, sulfonated vegetable oils and sulfonated marine animal oils. Commercially available emulsifiers of this group are TALLOSAN RC, a sulfonated tallow marketed by General Dyestuff Corporation; ACIDOLATE, a sulfonated oil marketed by White Laboratories, Inc.; and CHEMOIL 412, a sulfonated castor oil marketed by Standard Chemical Company.

Various sulfonated and sulfated fatty acid esters of mono- and polyvalent alcohols are also suitable such as NOPCO 2272R, a sulfated butyl ester of a fatty ester marketed by Nopco Chemical Company; NOPCO 1471, a sulfated vegetable oil marketed by Nopco Chemical Company; SANDOZOL N, a sulfated fatty ester marketed by Sandoz, Inc.; and STANTEX 322, an ester sulfate marketed BY Standard Chemical Products, Inc.

Sulfated and sulfonated fatty alcohols are also useful as an emulsifier and include anionic agents such as DUPONAL ME, a sodium lauryl sulfate, DUPONAL L142, a sodium cetyl sulfate, DUPONAL LS, a sodium oleyl sulfate, which are marketed by E. I. duPont de Nemours and Company; and TERGITOL 4, a sodium sulfate derivative of 7-ethyl-2methyl, 4-undecanol, TERGITOL 7, a sodium sulfate derivative of 3,9-diethyl tridecanol-6 and TERGITOL 08, a sodium sulfate derivative of 2-ethyl-1-hexanol, which are marketed by Union Carbide Corporation, Chemical Division.

Preferred anionic emulsifiers are the alkyl esters of the alkali metal salts of sulfosuccinic acid. Exemplary emulsifiers include Disodium N-octadecyl sulfosuccinamate marketed under the trademark "AEROSOL 18;" the disodium ethoxylated alcohol half esters a sulfosuccinic acid marketed under the trademark "AEROSOL A-101, A-102, and A-103"; the diamyl ester of sodium sulfosuccinic acid marketed under the trademark "AEROSOL AY;" the diisobutyl, dioctyl and dihexyl ester of sodium sulfoxuccinic acid marketed under the respective trademarks "AEROSOL IB, AEROSOL GPG, OT and OT-B" and "AEROSOL MA;" and the bis (tridecyl) ester of sodium sulfosuccinic acid marketed under the trademark "AEROSOL TR." The Aerosol emulsifiers are marketed by the American Cyanamid Company, Industrial Chemicals and Plastics Division.

Cationic emulsifiers can also be employed and include various amines such as ETHOQUAD C/12, ETHOQUAD O/25, ETHOQUAD 18/12 which are polyethoxylated quaternary ammonium salts marketed by Armour Industrial Chemical Company; INDULIN W-1, a lignin derivative marketed by West Virginia Pulp and Paper Co.; KATAPOL VP-532 and KATAPOL PN-430 which are polyoxyethylated alkylamines marketed by General Aniline and Film Corporation; ROMINE O, an oleyl imidazoline marketed by Rozilda Laboratories, Inc.; TRITON X-400, a steryldimethylbenzyl ammonium chloride marketed by Rohm and Haas Company; VARIQUAT 638, K300 and L200 which are ethoxylated quatermary, dicoco dimethyl ammonium chloride and alkenyl trimethyl ammonium chloride, respectively, and marketed by Varney Chemical Corporation; and AMINE C, O, S. and T which are heterocyclic tertiary amines marketed by Geigy Industrial Chemicals.

Another additive which can be included within the adhesive emulsion is a plasticizer. The plasticizer may be added to the emulsion after the termination of the polymerization reaction. The plasticizer does not substantially affect the adhesive properties of the emulsion and it can be employed in an amount from 0.01 to 10 weight percent of the total emulsion weight to impart a desired surface property to the adhesive. For example, in one aspect a plasticizer can increase the tackiness of adhesives obtained from the final emulsion product. Suitable plasticizers which may be employed herein include phthalate esters, such as, diethyl phthalate, dibutyl phthalate, di-2-ethylhexyl phthalate, dicapryl phthalate, di-lauryl phthalate, methylcyclohexyl phthalate, di-methoxyethyl phthalate, di-butoxyethyl phthalate, etc.; phosphoric acid derivatives, such as, trichlorethyl phosphate, tributyl phosphate, tri-ethylhexyl phosphate, tributylglycol phosphate, etc.; glycol derivatives, such as, polyethylene glycol 200–400 marketed by Carbide and Carbon Chemicals Corporation, triethyl citrate, acetyl triethyl citrate, butyl phthalyl butyl glycollate, dibutyloxalate, diamyloxalate, methyl-cyclohexanol oxalate, etc.; esters of adipic and sebacic acids, such as dioctyl adipate, citratoxy ethyl adipate, di-hexyl sebacate, etc.; esters of abietic and ricinoleic acids, such as methyl dihydroabietate, ethylene glycol diabietrate, glyceryl monoricinoleate, ethyl glycol mono-methyl ether acetyl ricinoleate, etc.; and toluene sulfonic acid derivatives, such as o- and p-toluene sulfonamide, p-toluene sulfanilide, etc.

Other types of plasticizers which can be employed herein include chlorinated diphenyls such as AROCLOR 1242, and extender type plasticizers such as the substituted biphenyls marketed by Monsanto Chemical Company under the trademark HB-40 and HB-20.

The following Table II briefly summarizes the components which make up the adhesive emulsion of this invention. The content ranges are expressed in weight percent of the product emulsion except as otherwise indicated.

TABLE II

Adhesive Compositions

| Component | Broad | Preferred | most Preferred |
|---|---|---|---|
| Seed Emulsion | 5–50 | 5–30 | 10–25 |
| Polyvinyl Alcohol Mixture [1] | 1.5–6 | 2–5 | 2.5–4 |
|   Fully Hydrolyzed [2] | 10–90 | 20–80 | 30–70 |
|   Partially Hydrolyzed [3] | 10–90 | 80–20 | 70–30 |
| Vinyl Acetate Monomer [4] | 5–60 | 25–60 | 30–55 |
| Unsaturated Acid Monomer | 0.01–1 | 0.05–0.5 | 0.07–0.2 |
| Emulsifier | 0.01–5 | 0.1–2 | 0.1–1 |
| Plasticizer | 10 | 0.1–5 | 0.5–3 |
| Water | 75–30 | 65–35 | 60–40 |

[1] Designates the polyvinyl alcohol added to the final emulsion and does not include the partially hydrolyzed polyvinyl acetate present in the seed emulsion.

[2] The amount of fully hydrolyzed polyvinyl acetate in the polyvinyl alcohol mixture.

[3] The amount of partially hydrolyzed polyvinyl acetate in the polyvinyl alcohol mixture.

[4] The amount of vinyl acetate varies with the selected seed emulsion as shown in Table I.

POLYMERIZATION PROCEDURE

Various emulsion polymerization techniques can be employed herein to obtain the desired polymer, however it is preferred to conduct the polymerization reaction in a batch process using a kettle, and a stirrer to maintain intimate mixing of the emulsified reactants. The polymerization is started by charging water into the vessel along with an effective amount of a buffering agent to maintain the solution pH during polymerization between about 3 and 9, and preferably between about 4 and 8. When redox agents are employed, they can be charged to the reactor in the necessary quantitiies.

The reactor is purged several times with an inert gas such as nitrogen to evacuate all of the oxygen which may be present in the gas phase and thereafter purged with ethylene to obtain a relatively pure ethylene content in the gas phase at a pressure of from about 100 to 1000 psig., and preferably from about 2000 to 600 psig. It is recognized, however, that the presence of inert gases in the reactor does not render the invention inoperable, and the polymerization reaction may proceed even though the ethylene in the gas phase is diluted with inert vapors. After the reactor is purged it can then be charged with the polyvinyl alcohol mixture, the seed emulsion, the unsaturated acid, the emulsifier, the plasticizer, and vinyl acetate monomer and agitated to form an aqueous emulsion.

It is preferred to employ a precharge technique where only a small amount of the vinyl acetate monomer, such as, from 0.1 to 10 weight percent of the product emulsion and a small amount of the polyvinyl alcohol mixture, such as, from 0.01 to 1 weight percent of the emulsion be initially charged to the reactor with all of the seed emulsion, redox agent, and emulsifying agent, if one is employed. The remaining portion of vinyl acetate and polyvinyl alcohol mixture and the unsaturated acid along with the polymerization initiator is thereafter slowly charged to reactor and emulsified components during the polymerization reaction to that substantial monomer addition may occur on primortal polymers. In this manner it is possible to obtain polymers in the final emulsion having a size from about 0.5 to 3 microns.

The polymerization initiator is charged to the reactor in an amount effective for polymerization, e.g., from about 0.05 to 5 weight percent based on the total vinyl acetate monomer maintained therein, and the reactor is heated to a temperature of from 100° to 160°F. and preferably between 110° to 145°F. to initiate the reaction. The initiator and reactant are stirred sufficiently to thoroughly agitate the contents of the reactor and to maintain the solids emulsified in the aqueous solution. After initiation of the reaction, the temperature of the emulsion is allowed to rise to between 160° and 185°F., and preferably between about 170° and 180°F., and maintained at the selected temperature by circulating a cooling liquid through the cooling jackets of the reactor. Preferably the bulk of the vinyl acetate and polyvinyl alcohol mixture (from 70 to 95 percent of each) and all of the unsaturated acid are concurrently and slowly charged to the reactor with the proper amount of initiator after the emulsion temperature is maintained between about 160° and 185°F. When a redox agent is employed, the initiation and polymerization reaction can be conducted at lower temperatures and accordingly the reaction can be conducted at temperatures between about 100°F and 160°F.

In a particularly preferred embodiment of the above polymerization procedure, the solids content in the reactor after the addition of the seed emulsion to the aqueous solution is adjusted to between about 15 and 30 weight percent prior to the addition of the initiator, vinyl acetate and polyvinyl alcohol. Also, the initiator, vinyl acetate, plasticizer and polyvinyl alcohol mixture are concurrently introduced into the reactor at slow addition rates, i.e., between about ⅞ and ¼ of the total amount of each additive is charged to the reactor per hour until all the initiator, vinyl acetate, unsaturated acid, plasticizer and hydrolyzed polyvinyl acetate are charged into the reactor.

The polymerization reaction is conducted until the free vinyl acetate monomer content in the emulsion is less than 1 weight percent and preferably less than 0.6 weight percent. In the event that the free monomer content is higher than the above concentrations after a reaction period of about 4 hours, an additional amount of initiator can be charged to the reactor to reduce the monomer content or, alternatively, the reaction temperature can be increased. The reactor is then cooled and depressured and the excess ethylene gas in the emulsion is removed. Instances where large batches of the adhesive emulsion is employed, it may be advantageous to introduce a defoaming agent into the emulsion during the degassing procedure to prevent a large froth or foam from developing on the emulsion surface.

The adhesive compositions made by the practice of this invention have particular utility in the adhesion of vinyl plastics to solid substrates or other vinyl plastics. The adhesive latex is applied to a surface of the vinyl plastic or a conjunctive surface of a solid substrate and the treated surface or surfaces are pressed together so that the latex is contiguous to both surfaces. The latex is allowed to cure for a sufficient period, such as, from 1 to 48 hours to form a laminated structure or article. Thus the adhesive latex of this invention can be used to form laminated articles comprising sheets of vinyl plastics or sheets of vinyl plastics and other solid substrates or alternatively, the adhesive latex can be used to adhere irregular shaped vinyl plastics, such as, tubes, etc., to solid structures. The amount of adhesive latex which is necessary in order to obtain the desired bond with the vinyl plastic varies greatly and depends upon the type and surface of the plastic employed as well as the necessary adhesive strength required. Generally, however, it is desired that the amount of latex employed will be sufficient to deposit a layer of adhesive which is from 1 to 50 mils and preferably from 4 to 20 mils in thickness.

The vinyl plastic which can be effectively employed herein, includes polyvinyl chloride, polyvinyl dichloride, polyvinyl fluoride, polyvinyl formal, polyvinylidene chloride, polyvinyl butyral, polystyrene, etc. and copolymers thereof and especially copolymers of polyvinyl chloride. Exemplary vinyl plastics which can be effectively employed herein include, SEILON CR100 and SEILON HI4000, a polyvinyl chloride marketed by Seilon Inc., TEDLAR 15 and TEDLAR 25, a polyvinyl fluoride marketed by DuPont de Nemours, and SEILON 3400 a polystyrene marketed by Seilon Inc.

The adhesive latex can be successfully applied to any solid substrate, such as, wood, glass, concrete, metals, synthetic resins, etc., or any conventional support structure. The surface of the substrate can be relatively rough, smooth or highly polished, however, the adhesion will be better if the substrate surface is slightly rough. Thus in one embodiment of this invention, the adhesive latex can be employed to adhere a polyvinyl chloride sheet to a wooden or metal surface.

The invention is further illustrated by the following examples which are illustrative of specific modes of this invention and which are not intended as limiting the scope of the invention as defined by the appended claims.

EXAMPLES 1-6

In these examples a series of experiments are described which illustrate the effectiveness of the product adhesive in adhering to vinyl plastics and exhibiting a high thickening response when admixed with a standard plasticizer. In each test employing a seed emulsion, the seed emulsion is prepared by the following procedure.

PREPARATION OF SEED EMULSION

A 30 gallon stainless steel pressure reactor equipped with a cooling jacket and a stirrer is charged with 17.2 kilograms of water, 132 grams of sodium bicarbonate, 6.9 grams of FORMOPON (a sodium formaldehyde sulfoxylate), 324 grams of AEROSOL MA-80 (a dihexyl ester of sodium sulfo-succinic acid), and 2.83 kilograms of vinyl acetate monomer. The contents of the reactor are stirred at ambient temperature until all of the bicarbonate is dissolved in the aqueous phase.

Oxygen is removed from the vapor space within the reactor by purging it twice with nitrogens at a pressure of 100 psig and twice with ethylene at a pressure of 300 psig. The reactor is then pressured at 500 psig with ethylene and the stirring rate is increased to about 200 rpm. The contents are then slowly heated to 175°F. Simultaneously with the heating, 1000 milliliters of an aqueous solution of 14 weight percent of partially hydrolyzed polyvinyl acetate marketed under the trademark ELVANOL 51-05 and 725 milliliters of a 2.7 weight percent aqueous solution of potassium persulfate, are charged to the reactor.

When the temperature attains 170°F. the stirring rate is increased to 300 rpm and cooling water is circulated through the reactor jackets to stabilize the reactor temperature at 175°F. After the temperature has stabilized (approximately 15 minutes), 27.2 kilograms of vinyl acetate is slowly charged to the reactor at a rate of 1.82 kilograms per hour. Simultaneously, 6.5 liters of an aqueous solution of 2.7 weight percent potassium persulfate and 19 liters of 14 weight percent aqueous EVANOL 51-05 are slowly charged to the reactor at a rate of 4.3 liters per hour and 12.7 liters per hour respectively.

After the free monomer content of the emulsion is less than 5 weight percent as determined by bromine titration, the reactor is depressurized and cooled to ambient temperatures. The total time for the polymerization process is approximately 4 hours. At the end of the run, a sample of the emulsion is withdrawn and the ethylene content is calculated from an elemental analysis.

PREPARATION OF FINAL EMULSION

The final emulsion is prepared by charging the reactor employed in preparing the seed emulsion with 6.5 kilograms of water, 13.7 kilograms of seed emulsion screened through a 60 mesh Tyler equivalent sieve, 132 grams of sodium bicarbonate 6.9 grams of FORMOPOL (a sodium formaldehyde sulfoxylate) and 2.9 kilograms of vinyl acetate monomer. The contents of the reactor are stirred at ambient temperature until all of the bicarbonate is dissolved in the aqueous phase.

Oxygen is removed from the vapor space within the reactor by purging it twice with nitrogen at a pressure of 100 psig. and twice with ethylene at a pressure of 350 psig. The reactor is then pressured to 500 psig. with ethylene and the stirring rate maintained at 150 rpm. The contents are then slowly heated to 175°F. Simultaneously therewith, 320 milliliters of an aqueous potassium persulfate solution (2.75 weight percent $K_2S_2O_8$) are charged to the reactor.

When the temperature attains 175°F., cooling water is circulated through the reactor jackets to maintain the reactor temperature at 175°F. After the temperature has stabilized (approximately 15 minutes) 24.6 kilograms of vinyl acetate and 108 grams of acrylic acid (when employed) are slowly charged to the reactor at a combinate rate of 16.4 kilograms per hour. Simultaneously therewith, 7.2 liters of an aqueous 2.75 weight percent potassium persulfate solution, and 14.9 liters of a polyvinyl alcohol solution are charged to the reactor at a rate of 4.6 and 10 liters per hour respectively. The polyvinyl alcohol solution consisted of water, 5.5 weight percent of ELVANOL 51-50, 9.5 weight percent of ELVANOL 70-05, 0.71 weight percent of AEROSOL MA–emulsifier.

The polymerization conditions are maintained until the free monomer content in the emulsion is less than 1 weight percent. The reactor is then depressured and its contents cooled to ambient conditions. The total time for the polymerization process is approximately 4 hours. At the end of the process run, a sample of the emulsion is withdrawn and the ethylene content is calculated from an elemental analysis.

The sample is further subjected to a thickening response test and a hot vinyl adhesion test.

THICKENING RESPONSE TEST

In this test the product emulsion is tested for its ability to increase in viscosity by the addition of a minor amount of a standard plasticizer. In the test, 200 grams of the emulsion are placed in a 250 milliliter glass beaker at room temperature. The viscosity of the emulsion is measured by a Brookfield measuring apparatus at 20 rpm. A mechanical stirrer is then placed in the beaker and the emulsion is agitated at a rate insufficient to trap air bubbles during stirring. During the agitation, 35 grams of commercial grade (99–100 percent) dibutyl phthalate are added to the beaker and the admixture is stirred for an additional 5 minutes. At the end of five minutes, the stirrer is withdrawn and the viscosity of the emulsion is measured by a Brookfield measuring apparatus at 20 rmp. The ratio of the viscosity of the resulting admixture to the viscosity of the original emulsion is the thickening factor. A high thickening factor represents a good thickening response.

VINYL ADHESION TEST

In this test the product emulsion is tested for its ability to adhere to vinyl surfaces under elevated temperature conditions. In the test a small amount of emulsion is applied, at ambient temperatures, to one side of a one-inch wide strip of unsupported plasticized polyvinylchloride sheet (6 mils thick) and the strip is pressed against a piece of plywood. The amount of adhesive employed is sufficient to obtain a 4-mil thick film of adhesive between the polyvinylchloride sheet and the plywood. The sample is cured at room temperature for a minimum period of 16 hours and thereafter is heated in an oven to a temperature of 130°C. A strip of the vinyl film is initially peeled from the plywood for a distance of about ¼ inch, and a 14 gram weight is hung on the peeled end of the hot vinyl strip. The sample is hung in a vertical position so that the attached weight will continue to peel the strip of vinyl from its plywood base. The time required to peel the vinyl strip 5.0 inches is the strength time and represents the creep resistance of the product emulsion.

The thickening response and creep resistance for various emulsions are presented in Table III.

EXAMPLE 8

Several adhesive compositions are prepared in substantially the same procedure as disclosed in Examples 1–6. The solids content is varied from 40 to 65 weight percent, a plasticizer and an emulsifying agent are employed and are added to the reactor with the polyvinyl

TABLE III.—CHARACTERISTICS OF EMULSION

| | Seed batch | | | Final batch | | | | | |
|---|---|---|---|---|---|---|---|---|---|
| Run No. | Emulsifier (wt. %) | Ethylene (wt. %) | PVA[1] (wt. %) | Seed (wt. %) | Emulsifier (wt. %) | AA[2] (wt. %) | Ethylene (wt. %) | T. F.[3] | C. R.[4] (min.) |
| 1 | | | | | | | 14.9 | 2.3 | 4.5 |
| 2 | 0.3 | 12 | 4 | 20 | | | 14.5 | 4.3 | 7.0 |
| 3 | .3 | 11.8 | 4 | 20 | | 0.1 | 12.5 | 9.1 | 12.8 |
| 4 | .3 | 11.8 | 4 | 20 | 0.1 | .1 | 12.5 | 9.2 | 25.7 |
| 5 | .3 | 11.8 | 4 | 20 | .2 | .1 | 12.3 | 8 | 27 |
| 6 | .5 | 14.2 | 4 | 20 | | .1 | 13.7 | 8.7 | 10.1 |

[1] PVA represents the partially hydrolyzed polyvinyl acetate.
[2] AA represents acrylic acid.
[3] T. F. represents thickening factor.
[4] C. R. represents the creep resistance.

It is apparent from the above table that the employment of a seed emulsion substantially increases the thickening factor and creep resistance of the product emulsion from values of 2.3 and 4.5 minutes as demonstrated in Example 1 to values of 4.3 and 7 minutes as demonstrated in Example 2. The addition of acrylic acid further enhanced the creep resistance to 12.8 minutes 10.1 minutes as demonstrated in Examples 3 and 6 respectively. The addition of an emulsifier further increased the creep resistance to 25.7 minutes (Example 4) 27 minutes (Example 5).

alcohol. Various unsaturated acids other than acrylic acid are also employed. The amount of seed emulsion and polyvinyl alcohol is also varied. These adhesives are presented in the following Table IV and have good adhesive properties.

TABLE IV

| Emulsion Composition | Experimental compositions | | | | | | | | | |
|---|---|---|---|---|---|---|---|---|---|---|
| | 1 | 2 | 3 | 4 | 5 | 6 | 7 | 8 | 9 | 10 |
| Seed emulsion (wt. percent) | 5 | 5 | 10 | 10 | 10 | 10 | 20 | 20 | 20 | 20 |
| Elvanol 51-05[1] | 1.0 | 1.0 | 2.0 | 2.0 | 2.0 | 2.0 | 2.0 | 2.0 | 2.0 | 5 |
| Polyvinyl alcohol: | | | | | | | | | | |
| Elvanol 70-05 (wt. percent) | 1.0 | 1.5 | 1.5 | 2 | 2 | 2 | 2 | 2 | 3 | 3 |
| Elvanol 51-05 (wt. percent) | 0.5 | 1 | 1 | 1 | 1 | 1 | 1 | 2 | 2 | 3 |
| Elvanol 52-22 (wt. percent) | | | | 1 | | 2 | 1 | | | |
| Unsaturated acid: | | | | | | | | | | |
| Methacrylic acid (wt. percent) | 0.1 | | | 0.1 | 0.2 | 0.1 | | 0.1 | 0.1 | 0.08 |
| Itaconic acid (wt. percent) | | 0.1 | | | | | 0.2 | | .1 | |
| Maleic acid (wt. percent) | | | 0.1 | | | | | 0.1 | .1 | |
| Plasticizer: | | | | | | | | | | |
| Di-butoxyethyl phthalate (wt. percent) | | | | | | 1 | | 1 | | |
| p-toluene sulfonamide (wt. percent) | | | | | | | | 0.5 | | |
| Emulsifier: | | | | | | | | | | |
| Igepal Co-630 (wt. percent) | | | | | 0.5 | | | | | 1.0 |
| Pluronic L-64 (wt. percent) | | | | | | 1 | | 1 | | |
| Surfynol 485 (wt. percent) | | | | | | | | | 2 | 1.0 |
| Aerosol MA (wt. percent) | 0.3 | 0.3 | 0.3 | | | 0.5 | | 0.2 | | |
| Solids content (wt. percent) | 40 | 50 | 55 | 55 | 55 | 55 | 55 | 60 | 60 | 65 |

[1] Weight percent of seed emulsion.

EXAMPLE 7

Samples of the adhesive emulsion prepared by the method of Examples 3–6 are respectively applied to one side of a separate glass plate and each plate is respectively pressed against a flat plywood surface. The amount of adhesive employed in each test is sufficient to obtain a 4 mil thick film of adhesive between the glass plate and the plywood. The samples are allowed to cure at room temperature for a minimum period of 16 hours and thereafter the adhesion of the glass plates to the respective pieces of plywood is measured. Each of the samples had excellent adhesion to the plywood and glass plate.

The preceding examples are presented solely to illustrate the preferred mode of practice of the invention and to demonstrate results attained therewith. It is not intended that these examples be construed as unduly limiting the invention but instead it is intended that the invention include the reagents and steps and their obvious equivalents set forth in the following claims.

I claim:

1. In a process for the manufacture of an adhesive emulsion wherein from 5 to 60 weight percent of vinyl acetate is concurrently contacted in an aqueous emulsion medium with from 0.05 to 5.0 weight percent of a polymerization initiator and ethylene under a pressure of from 100 to 1000 psig., sufficient to incorporate from 5 to 20 weight percent ethylene in the resulting copolymer, and at a temperature sufficient to activate said initiator and cause a polymerization of said vinyl acetate and ethylene, the improvement comprising:
admixing with said aqueous medium prior to said polymerization between about 5 and 50 weight percent, based on said adhesive emulsion, of an aqueous seed emulsion containing from 1 to 5 weight percent of partially hydrolyzed polyvinyl acetate having from 50 to 95 percent of its acetate groups hydrolyzed, from 0.05 to 1 weight percent of an anionic surfactant comprising an alkyl ester of an alkali metal sulfosuccinate, and from 25 to 65 weight percent of an ethylene-vinyl acetate copolymer having from 5 to 20 weight percent ethylene, and introducing into contact with said aqueous medium during said polymerization: (1) between about 0.01 and 1 weight percent based on said adhesive emulsion of an ethylenically unsaturated mono or di carboxylic acid having from 3 to 6 carbon atoms; (2) between about 0.01 and 5 weight percent based on said adhesive emulsion of an emulsifier; and (3) between about 1.5 and 6 weight percent, based on said adhesive emulsion, of a polyvinyl alcohol mixture comprising fully hydrolyzed polyvinyl acetate and partially hydrolyzed polyvinyl acetate having from 50 to 95 percent of its acetate groups hydrolyzed with a weight ratio of fully to partially hydrolyzed polyvinyl acetate being between about 1 to 10 and 10 to 1.

2. The process defined in claim 1 wherein said partially hydrolyzed polyvinyl acetate in said seed emulsion and in said polyvinyl alcohol mixture is about 80 to 95 percent hydrolyzed and exhibits a viscosity of about 2 to 80 centipoises for a 4 weight percent aqueous solution at a temperature of 20°C.

3. The process defined in claim 1 wherein said fully hydrolyzed polyvinyl acetate exhibits a viscosity of from about 5 to 125 centipoises for a 4 weight percent aqueous solution at a temperature of 20°C.

4. The process defined in claim 1 wherein said weight ratio of fully to partially hydrolyzed polyvinyl alcohol is between about 1 to 5 and 5 to 1.

5. The process defined in claim 1 wherein said unsaturated acid is acrylic acid.

6. A process for the production of an emulsion adhesive which comprises:
emulsifying in an aqueous medium having a pH of about 3 to 9 the following ingredients: (1) between about 5 to 50 weight percent of an aqueous seed emulsion comprising from 1 to 5 weight percent of partially hydrolyzed polyvinyl acetate having from 50 to 95 percent of its acetate groups hydrolyzed, from 0.01 to 1 weight percent of an anionic surfactant comprising an alkyl ester of an alkali metal sulfosuccinate, and from 25 to 65 weight percent of ethylene-vinyl acetate copolymers having about 5 to 20 weight percent ethylene, (2) between about 0.01 and 1 weight percent of a polyvinyl alcohol mixture formed of polyvinyl acetate and partially hydrolyzed polyvinyl acetate with a weight ratio of fully to partially hydrolyzed polyvinyl acetate between about 1 to 10 and 10 to 1, and (3) between about 0.1 and 5 weight percent of vinyl acetate monomer;
contacting the emulsified mixture with a water-soluble free radical polymerization initiator and ethylene at a pressure of from 100 to 1000 psig. and maintaining the temperature of said emulsified mixture between about 100° and 200°F. to activate said initiator and polymerize said ethylene and vinyl acetate;
slowly introducing into said emulsified mixture during said polymerization from 0.01 to 1 weight percent of the emulsified mixture of an ethylenically unsaturated mono or di carboxylic acid having from three to six carbon atoms, from 0.01 to 5 weight percent, based on the emulsified mixture, of an emulsifier, and additional amounts of vinyl acetate and said polyvinyl alcohol mixture so that the total amount of vinyl acetate added to the emulsified mixture is from about 5 to 60 weight percent and the total amount of polyvinyl alcohol mixture added to the emulsified mixture is from 1.5 to 6 weight percent; and
maintaining the polymerization conditions until the free vinyl acetate monomer content of said emulsion is reduced to less than 1 weight percent.

7. The process defined in claim 6 wherein said partially hydrolyzed polyvinyl acetate in said seed emulsion and in said polyvinyl alcohol mixture is from about 80 to 95 percent hydrolyzed and exhibits a viscosity of about 2 to 80 centipoises for a 4 weight percent aqueous solution at a temperature of 20°C.

8. The process defined in claim 6 wherein said fully hydrolyzed polyvinyl acetate exhibits a viscosity of from about 5 to 125 centipoises for a 4 weight percent aqueous solution at a temperature of 20°C.

9. The process defined in claim 6 wherein said weight ratio of fully hydrolyzed to partially hydrolyzed polyvinyl acetate is between about 1 to 5 and 5 to 1.

10. The process defined in claim 9 wherein about 0.01 and 5 weight percent of an anionic emulsifying agent is also emulsified in said aqueous medium.

11. The process defined in claim 10 wherein a redox agent is also emulsified in said aqueous medium.

12. The process defined in claim 10 wherein said unsaturated acid is acrylic acid.

13. The product produced by the method of claim 6.

14. An article of manufacture comprising a substrate having a solid surface, a vinyl plastic having a surface conjunctive with the solid surface of said substrate and adhered thereto by an adhesive interlayer formed from an ethylene-vinyl acetate adhesive emulsion prepared by the method of claim 7.

15. The article of claim 14 wherein said substrate is wood, glass, metal, concrete or a synthetic resin.

16. The article of claim 15 wherein said vinyl plastic is polyvinyl chloride.

17. The process of claim 1 wherein said emulsifier is an alkyl ester of an alkali metal sulfosuccinate.

18. The process of claim 1 wherein said surfactant in said seed emulsion and said emulsifier are dihexylsodium sulfosuccinate.

19. The process of claim 6 wherein said emulsifier is an alkyl ester of an alkali metal sulfosuccinate.

20. The process of claim 6 wherein said surfactant in said seed emulsion and said emulsifier are dihexylsodium sulfosuccinate.

* * * * *